United States Patent
Imazu et al.

(10) Patent No.: US 6,971,968 B2
(45) Date of Patent: Dec. 6, 2005

(54) HYBRID TRANSMISSION CONTROL SYSTEM

(75) Inventors: Tomoya Imazu, Yokohama (JP); Keyvan Kargar, Versailles (FR); Yves Pichon, Boulogne Billancourt (FR)

(73) Assignees: Nissan Motor Co., Ltd., Yokohama (JP); RENAULT s.a.s. societe par actions simplifiee, Boulogne-Billancourt (FR)

( * ) Notice: Subject to any disclaimer, the term of this patent is extended or adjusted under 35 U.S.C. 154(b) by 60 days.

(21) Appl. No.: 10/717,894

(22) Filed: Nov. 21, 2003

(65) Prior Publication Data

US 2004/0149501 A1    Aug. 5, 2004

(30) Foreign Application Priority Data

Nov. 26, 2002  (JP)  ............................. 2002-342572

(51) Int. Cl.⁷ ............................. B60K 5/08; F16H 3/72; F16H 37/06; H02P 17/00; B60L 11/00
(52) U.S. Cl. ........................... 477/2; 477/15; 180/65.2; 701/22; 475/4
(58) Field of Search ............................. 477/2, 15, 35; 475/2, 5; 701/22, 51; 180/65.2

(56) References Cited

U.S. PATENT DOCUMENTS

| | | | | |
|---|---|---|---|---|
| 5,967,940 A | * | 10/1999 | Yamaguchi | 477/107 |
| 6,253,127 B1 | | 6/2001 | Itoyama et al. | |
| 6,470,983 B1 | | 10/2002 | Amano et al. | |
| 2004/0043856 A1 | * | 3/2004 | Xiaolan | 475/5 |

FOREIGN PATENT DOCUMENTS

| | | |
|---|---|---|
| EP | 0 937 600 A2 | 8/1999 |
| JP | 2000-310131 A | 11/2000 |

* cited by examiner

Primary Examiner—Tisha Lewis
(74) Attorney, Agent, or Firm—Foley & Lardner LLP

(57) ABSTRACT

A transmission control system for a hybrid vehicle is comprised of a hybrid transmission including two motor/generators and a controller connected to the hybrid transmission. The controller is arranged to change the torque control of the motor/generator under the torque control to the revolution speed control and to change the revolution speed control of the other motor/generator under the revolution speed control to the torque control, when one of the torque of the motor/generator under the revolution speed control and the revolution speed of the motor/generator under the torque control becomes saturated.

11 Claims, 7 Drawing Sheets

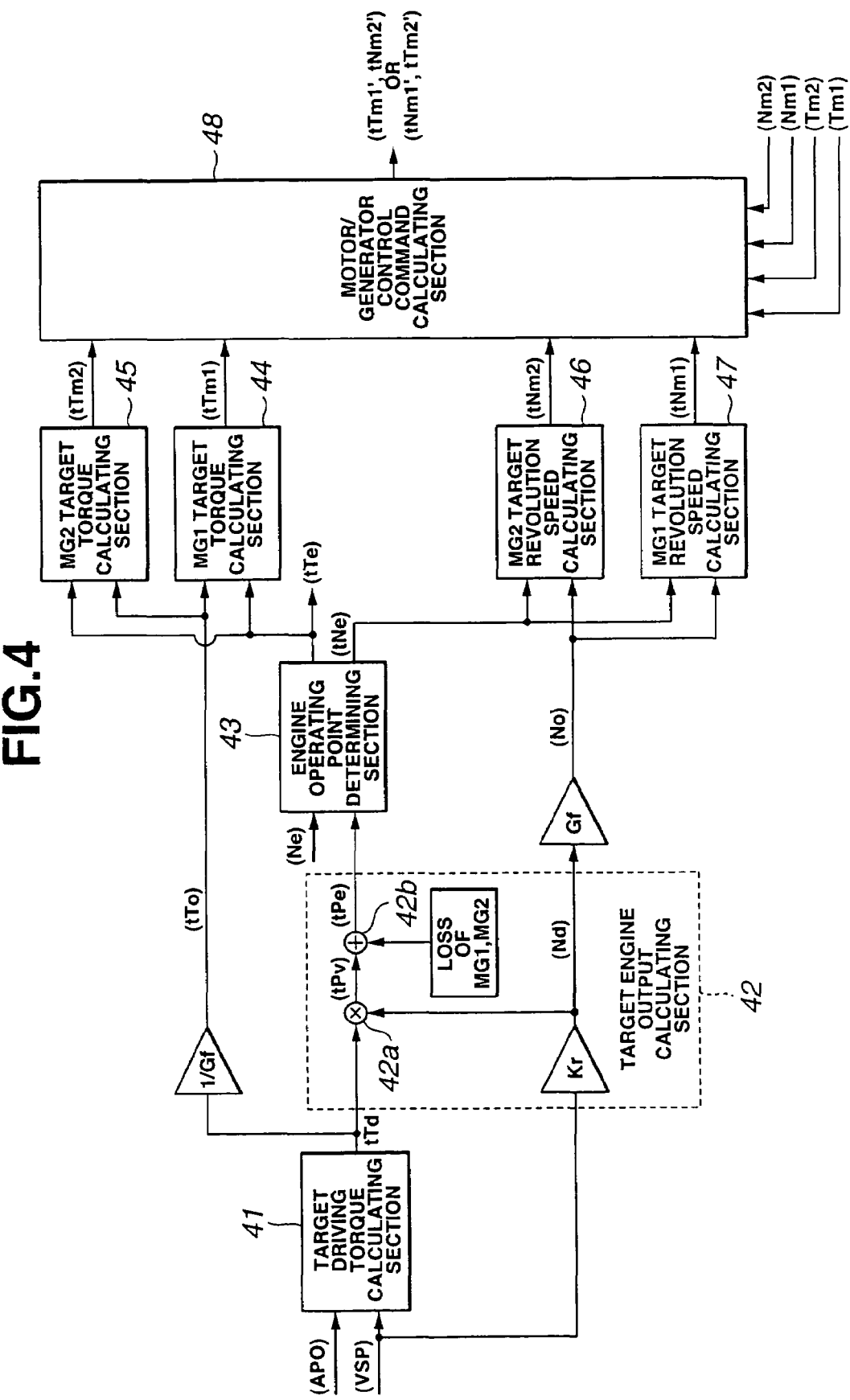

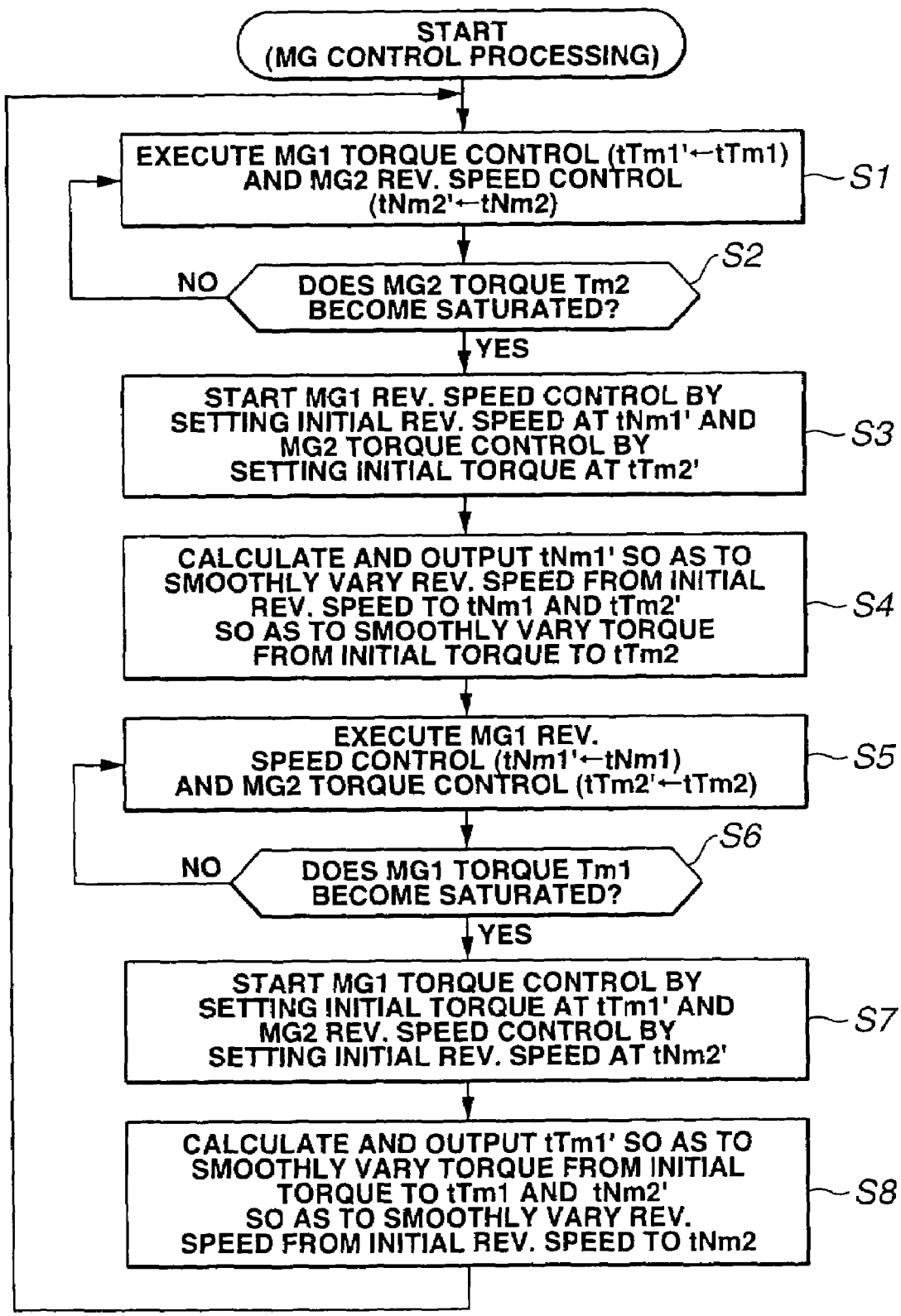

HYBRID TRANSMISSION CONTROL SYSTEM

BACKGROUND OF THE INVENTION

The present invention relates to a hybrid transmission which is applicable to a hybrid vehicle equipped with motor/generators and a prime mover such as an internal combustion engine, and more particularly to a control system for a hybrid transmission which system is capable of continuously varying a transmission ratio of the hybrid transmission using a differential mechanism.

Japanese Patent Provisional Publication No. 2000-310131 (corresponding to U.S. Pat. No. 6,470,983) discloses a hybrid transmission which comprises a two-degree-of-freedom differential mechanism including four rotating members. The rotating members are connected to an input connected to a prime mover, an output connected to a driveline, and two motor/generators, respectively. When an output revolution speed (corresponding to a vehicle speed VSP) of the rotating member connected to the driveline is determined, by determining the revolution speed of one of the other three rotating members, the revolution speeds of all of the rotating members are determined, and a transmission ratio is also determined. That is, executing the revolution speed control of one of the rotating members (respectively connected to the prime mover and the two motor/generators) is equivalent to controlling the transmission ratio. As to the relationship among torques of the four rotating members (shown on a lever diagram), by determining torques of the two rotating members, torques of the other two rotating members are also determined regardless of the revolution speed relationship among the rotating members.

Since a motor/generator is generally superior in responsibility and control accuracy of the torque control to an internal combustion engine, the engine in this system is mainly controlled by a constant torque control so as to realize a target torque according to the revolution speed. A transmission ratio control of this hybrid transmission is executed by controlling one of the motor/generators by means of a revolution speed control so as to bring an actual revolution speed closer to a target revolution speed which is determined from a target transmission ratio. Further, the other motor/generator is controlled by means of a torque control so as to bring an actual torque closer to a target torque which is determined from a torque balance expression on a lever diagram and an engine torque.

SUMMARY OF THE INVENTION

However, the thus arranged hybrid transmission system has a problem that the motor/generator under the torque control may be required to generate a torque greater than a torque limit for the reason that the torque of the motor/generator under the revolution speed control is fluctuated by an unexpected disturbance or the calculation error, even when it is determined that the required torque is within an allowable range during a calculation process for calculating the target transmission ratio and a torque balance thereof.

In such a situation, since a controller of the motor/generator limits the actual torque within a limit value for protecting the motor/generator from damages, it becomes impossible to continue the revolution speed control due to the shortage of the torque required in the this control. Accordingly, this situation derives the deviation of the actual transmission ratio from the target transmission ratio. This deviation of the actual transmission ratio increases the revolution speed of the motor/generator put in an unable state of the speed control, in addition to preventing the accurate driving force control. In some cases, the motor/generator is put in a so-called over-revolution-speed state and thereby involving drawbacks in durability.

Subsequently, there will be verified this problem as to a hybrid transmission represented by a lever diagram shown in FIG. 8. A lever diagram of this hybrid transmission comprises a four-element and two-degree-of-freedom differential mechanism. As shown in FIG. 8, an input connected to the engine and an output connected to a driveline are connected to two rotating members which are located at inner positions on the lever diagram. Two motor/generators are connected to the other rotating members which are located at both outer positions on the lever diagram. In the lever diagram, $\alpha$ and $\beta$ are gear ratios of a planetary gearset constructing a differential mechanism when a distance between the input and the output is set at 1. The revolution speed of engine ENG is denoted by Ne, the engine torque is denoted by Te, the output revolution speed of the transmission is denoted by No, and the output torque of the transmission is denoted by To. Further, the revolution speed of second motor/generator MG2 is Nm2, and the torque of second motor/generator MG2 is denoted by Tm2.

Here, there is discussed a case that during when engine ENG is controlled by means of the torque control, first motor/generator MG1 is controlled by means of the torque control to execute an output control, and second motor/generator MG2 is controlled by means of the revolution speed control to execute a shift control. When the actual torque of engine ENG under the torque control has an error dTe relative to a torque command due to a disturbance and the like as shown in FIG. 8, torque Tm1 of first motor/generator MG1 is not basically changed for the reason that first motor/generator MG1 is controlled by means of the torque control. However, the change of the torque balance due to the error affects output torque TO of the transmission and the torque of second motor/generator under the revolution speed control. More specifically, output torque To is increased by an increase $dTo=\{(1+\beta)/\beta\} \times dTe$, and toque Tme of second motor/generator MG2 is increased by an increase $dTm2=(1/\beta) \times dTe$.

If the torque of the motor/generator under the revolution speed control deviates from the upper or lower limits and becomes saturated due to the increase dTm2 of second motor/generator MG2, it becomes difficult to maintain revolution speed Nm2 of second motor/generator MG2, and therefore revolution speed Nm2 is lowered as shown by a two-dot chain line in FIG. 8. This lowering of revolution speed Nm2 of second motor/generator MG2 rotates the lever denoted by a continuous line in FIG. 8 clockwise on output revolution speed No. As a result, revolution speed Ne of engine ENG is increased, and therefore the vehicle is accelerated by the increase of output torque To. Consequently, a state of the hybrid transmission is varied from a lever state denoted by the continuous line to a lever state denoted by a two-dot chain line, and output torque To is increased by an increase dTo and becomes different from a desired value.

Particularly, the hybrid transmission shown in Japanese Patent Provisional Publication 2000-310131 is arranged to always operate one of the two motor/generators under a low-speed and large-torque condition and the other of the two motor/generators under a high-speed and small-torque condition. This control tends to cause the saturation of the torque of the one of the two motor/generators and the revolution speed of the other motor/generator. Therefore, this hybrid transmission further tends to cause the above-discussed problem.

Even if a control of this hybrid transmission is additionally improved by a processing of varying the control command of first motor/generator MG1 under the torque control while detecting an error of the transmission ratio control in order to solve the problem, the following problems are newly caused. (1) Since this addition processing is executed after the generation of the error of the transmission ratio, a delay of time is generated. Therefore, it is impossible to completely prevent the fluctuation of the transient transmission ratio, and the degradation of the fuel consumption and the degradation of the operational feeling are caused. (2) Since this processing is not a processing in the normal control loop but an additional non-linear control system, it is difficult to design the operation. (3) It is difficult to prevent the interference between the operation of the additional control system and the original driving force control.

It is therefore an object of the present invention to provide a control system of a hybrid transmission which system is capable of solving a saturation of the torque of a motor/generator under a revolution speed control by changing the revolution speed of the motor/generator to a torque control while changing the torque control of the other motor/generator to the revolution speed control.

An aspect of the present invention resides in a transmission control system for a hybrid vehicle which comprises a hybrid transmission and a controller. The hybrid transmission comprises a differential mechanism which includes at least four rotating members. Rotating conditions of all of the rotating members is determined when rotating conditions of two of the rotating members are determined. Four of the rotating members is connected to one of two motor/generators, an input connected to a prime mover, an output connected to a driveline, and the other of the motor/generators. The one of the motor/generators is controlled by means of a revolution speed control to execute a continuous variable transmission ratio control. The other of the motor/generators is controlled by means of a torque control to execute an output control. The controller is connected to the hybrid transmission including the motor/generators. The controller is arranged to change the torque control of the motor/generator under the torque control to the revolution speed control and to change the revolution speed control of the other motor/generator under the revolution speed control to the torque control, when one of the torque of the motor/generator under the revolution speed control and the revolution speed of the motor/generator under the torque control becomes saturated.

Another aspect of the present invention resides in a method of controlling a hybrid transmission which is for a hybrid vehicle and comprises a differential mechanism including at least four rotating members. Rotating conditions of all of the rotating members is determined when rotating conditions of two of the rotating members are determined. Four of the rotating members is connected to one of two motor/generators, an input connected to a prime mover, an output connected to a driveline, and the other of the motor/generators. The one of the motor/generators is controlled by means of a revolution speed control to execute a continuous variable transmission ratio control. The other of the motor/generators being controlled by means of a torque control to execute an output control. The method comprises an operation of changing the torque control of the motor/generator under the torque control to the revolution speed control and of changing the revolution speed control of the other motor/generator under the revolution speed control to the torque control, when one of the torque of the motor/generator under the revolution speed control and the revolution speed of the motor/generator under the torque control becomes saturated.

The other objects and features of this invention will become understood from the following description with reference to the accompanying drawings.

BRIEF DESCRIPTION OF THE DRAWINGS

FIG. 4 is a block diagram showing a shift control executed by a hybrid controller of the control system shown in FIG. 3.

FIG. 6 is a flowchart showing a control program executed by a motor/generator control command calculating section shown in FIG. 4.

DETAILED DESCRIPTION OF THE INVENTION

Referring to FIGS. 1 through 9, there are shown embodiments of a control system for a hybrid transmission in accordance with the present invention.

Figure 1:
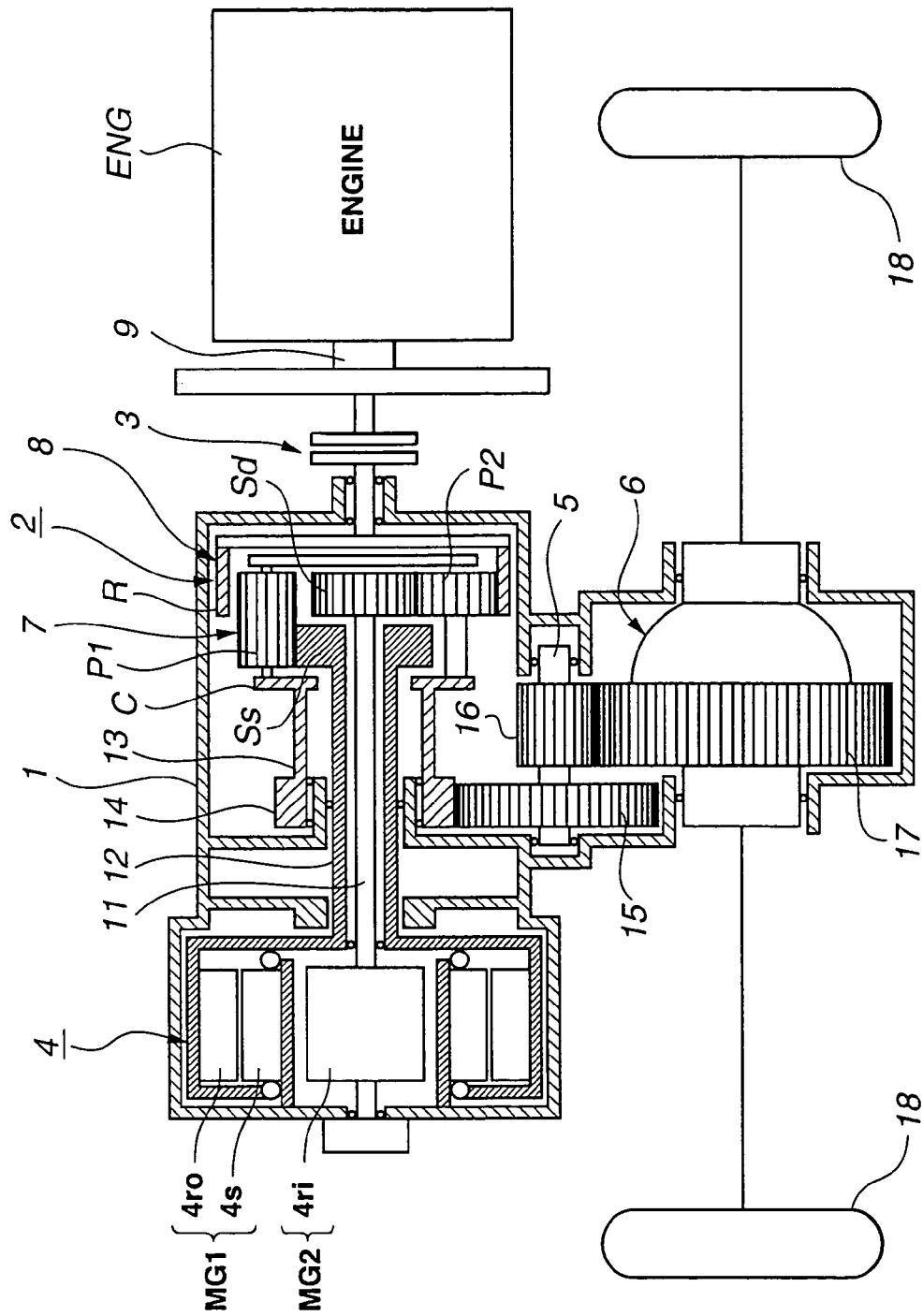
FIG. 1 is a schematic structural vi w showing a hybrid transmission to which a control system according to the present invention is applied.

FIGS. 1 and 6 show a first embodiment of the control system for the hybrid (automatic) transmission in accordance with the present invention. In this first embodiment, the hybrid transmission is adapted to a transaxle of a front-wheel-drive vehicle. As shown in FIG. 1, the hybrid transmission comprises a transmission case 1, a Ravigneaux planetary gearset 2, and a compound-current double-layer motor 4 constructing first and second motor/generators MG1 and MG2. Ravigneaux planetary gearset 2 is built in transmission case 1 so as to be located at a left-hand side of an internal combustion engine (prime mover) ENG along an axial direction of transmission case 1 in FIG. 1. Further, compound-current double-layer motor 4 is built in a transmission case 1 so as to be located at the left-hand side of Ravigneaux planetary gearset 2 along the axial direction of transmission case 1 in FIG. 1.

Ravigneaux planetary gearset 2, engine ENG and compound-current double-layer motor 4 are coaxially arranged on a main axis of transmission case 1. A counter shaft 5 and a differential gear device 6 are also built in transmission case 1 so as to be parallel with the main axis while being offset from the main axis.

Ravigneaux planetary gearset 2 is of a compound planetary gear train where a single-pinion planetary gearset 7 is combined with a double-pinion planetary gearset 8, and common long pinions P1 and a common ring gear R are commonly employed in two planetary gearsets 7 and 8. Single-pinion planetary gearset 7 has a structure that common long pinions P1 are meshed with a sun gear Ss. Double-pinion planetary gearset 8 comprises a sun gear Sd, a ring gear R, common long pinions P1, and large-diameter short pinions P2. Double-pinion planetary gearset 8 has a structure that short pinions P2 are meshed with sun gear Sd, ring gear R and common long pinions P1. Pinions P1 and P2 of the two planetary gearsets 7 and 8 are rotatably mounted or supported on shafts that integrally project from a common carrier C.

Ravigneaux planetary gearset 2 is mainly constituted by four rotating members, that is, sun gear Sd, sun gear Ss, ring gear R, and carrier C. When rotating conditions of two of the rotating members in Ravigneaux planetary gearset 2 are determined, rotating conditions of all of the rotating members are determined. That is to say, Ravigneaux planetary gearset 2 is a two-degree-of-freedom differential mechanism having four rotating elements. As is clear from a lever diagram shown in FIG. 2, the sequence of revolution speeds of the rotating members is arranged in the sequence of sun gear Ss, ring gear R, carrier C and sun gear Sd. It is of course that the differential mechanism is not limited to Ravigneaux planetary gearset 2 and may be freely selected from other gear mechanisms.

Compound-current double-layer motor 4 comprises an inter rotor 4ri, an annular outer rotor 4ro surrounding inner rotor 4ri and a stator coil 4s. Inner and outer rotors 4ri and 4ro are coaxially arranged with each other at the rear axial end (the left-hand end) of transmission case 1 and rotatably supported in transmission case 1. Annular stator coil 4s acting as a stator of compound-current double-layer motor 4 is disposed in an annular space defined between the outer periphery of inner rotor 4ri and the inner periphery of outer rotor 4ro and fixedly connected to transmission case 1. Annular stator coil 4s and outer rotor 4ro construct an outer motor/generator (first motor/generator) MG1, and annular stator coil 4s and inner rotor 4ri construct an inner motor/generator (second motor/generator) MG2.

In this embodiment, compound multiphase alternating current (AC) multi-layer (double-layer) motor 4, which has multiple motors (two rotors in this embodiment) and is driven by compound multiphase AC, is employed as first and second motor/generator MG1 and MG2. Further, compound-current double-layer motor 4 is arranged such that the number of pole pairs of inner rotor 4ri is different from the number of pole pairs of outer rotor 4ro. Outer and inner rotors 4ro and 4ri of first and second motor/generators MG1 and MG2 are therefore driven independently of each other in revolution speed and in revolution direction by compounding a control current applied to one of the motor/generator set and a control current applied to the other.

When compound multiphase alternating current is supplied to each of first and second motor/generators MG1 and MG2, each of motor/generators MG1 and MG2 functions as an electric motor which outputs a rotational force having a revolution direction corresponding to a current direction and a revolution speed (including a stopping state) corresponding to a current strength of the supplied current. When no compound multiphase alternating current is supplied to each of first and second motor/generators MG1 and MG2, each of first and second motor/generators MG1 and MG2 functions as a generator which outputs an electric power corresponding to the magnitud of torque applied by way of an external force.

Figure 2:
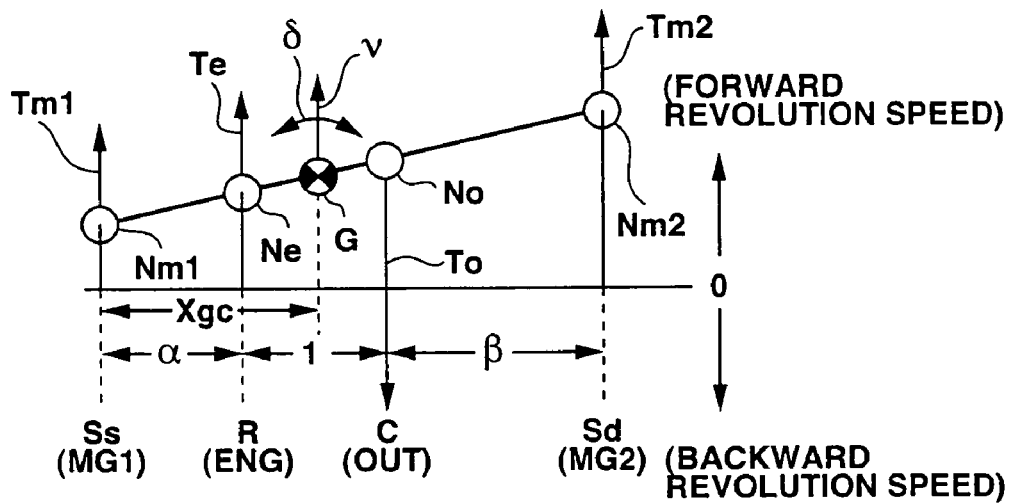
FIG. 2 is a lever diagram employed for obtaining a revolution balance expression and a torque balance equation of the hybrid transmission shown in FIG. 1.

As is shown in FIG. 2, sun gear Ss, ring gear R, carrier C and sun gear Ss, which are four rotating members of Ravigneaux planetary gearset 2, are connected to first motor/generator MG1 (outer rotor 4ro), engine ENG acting as a prime mover, an output OUT connected to a wheel driveline including differential gear device 6, and second motor/generator MG2 (inner rotor 4rl), respectively. This mentioned sequence of the four rotating members are arranged in the sequence of the revolution speeds.

The connection of the four rotating members of Ravigneaux planetary gearset 2 will be discussed in detail with reference to FIG. 1. Ring gear R acts as an input element through which the power of engine ENG is inputted to the hybrid transmission. Therefore, ring gear C is connected to a crankshaft 9 of engine ENG through a clutch 3. Sun gear Sd is connected to second motor/generator MG2 (inner rotor 4ri) through a shaft 11. Sun gear Ss is connected to first motor/generator MG1 (outer rotor 4ro) through a hollow shaft 14 which is coaxial with shaft 11.

In order to operate carrier C as an output element for outputting the driving force (rotational force) to the wheel driveline (OUT), carrier C is connected to an output gear 14 through a hollow shaft 13, and output gear 14 is meshed with a counter gear 15 integrally connected to a counter shaft 5 which is rotatably supported by transmission case 1. A final-drive pinion 18 is also integrally connected to counter shaft 5 and is meshed with a final-drive ring gear 17. The output rotational force outputted from the hybrid transmission is transmitted to final differential gear device through a final drive gearset constructed by final drive pinion 16 and final drive ring gear 17, and further distributed to right and left wheels 18 through differential gear device 6.

The above-discussed hybrid transmission can be represented by a lever diagram shown in FIG. 2. A horizontal axis of the lever diagram corresponds to a distance ratio among the rotating members which ratio is determined from a gear ratio of planetary gearsets 7 and 8. More specifically, a distance ratio between sun gear Ss and ring gear R is denoted by α and a distance ratio between carrier C and sun gear Sd is denoted by β, on the presumption that a distance between ring gear R and carrier C is set at 1. Further, a vertical axis of the lever diagram represents revolution speeds of the respective rotating members, that is, a revolution speed (an engine revolution speed) Ne of ring gear R, a revolution speed Nm1 of sun gear Ss (first motor/generator MG1), an output revolution speed No at output (OUT) from carrier C, and a revolution speed NM2 of sun gear Sd (second motor/generator MG2). When revolution speeds of two of four rotating members are determined, the revolution speeds of the other rotating members are also determined.

Revolution balance expressions in FIG. 2 are represented by $(Nm1-No):(Ne-Mo)=(1+\alpha):1$ and $(Ne-Nm2):(Ne-No)=(1+\beta):1$. Therefore, revolution speeds Nm1 and Nm2 of first and second motor/generator MG1 and MG2 are obtained from engine revolution speed Ne and output revolution speed No using the following expressions (1) and (2), respectively.

$$Nm1=(1+\alpha)Ne-\alpha \cdot No \qquad (1)$$

$$Nm2=(1+\beta)No-\beta \cdot Ne \qquad (2)$$

FIG. 2 further shows torques of the respective rotating members, that is, an engine torque Te, torques Tm and Tm of first and second motor/generators MG1 and MG2, an output torque To of output (OUT), in the form of vectors directed along the vertical direction in the lever diagram. Since an input rotation system connected to ring gear R includes engine ENG, the rotational inertia of the input revolution system is large. Further, since the output rotation system connected to carrier C includes the wheels 18 and differential gear device 6, the rotational inertia of an output rotation system is also large. Accordingly, barycenter (center of gravity) G of the lever is located between ring gear R (engine ENG) and carrier C (output OUT) as shown in FIG. 2. This position of barycenter G of the lever is represented by a distance Xgc from sun gear Ss to barycenter G.

In order to maintain a steady state wherein a target driving torque is realized while keeping a vehicle speed constant, it is necessary that a translational motion γ and a rotational motion δ generated by torques of the four rotating members are both zero. More specifically, it is necessary to satisfy an expression of Tm1+Te+Tm2 =To for realizing γ=0 and an expression (α+1)Tm1+Te=βTm2 for realizing δ=0. From these expressions, the balance expressions for the lever diagram in FIG. 2 are expressed by the following expressions (3) and (4).

$$Tm1 = -\{\beta \cdot To - (1+\beta)Te\}/(\alpha+1+\beta) \quad (3)$$

$$Tm2 = -\{(1+\alpha)To - \alpha \cdot T\}/(\alpha+1+\beta) \quad (4)$$

Although the first embodiment according to the present invention has been shown and described such that first and second motor/generators MG1 and MG2 are constructed by compound-current two-layer motor as shown in FIG. 2, the invention is not limited to these first and second motor/generators MG1 and MG2 and may be constructed by independent sets of a rotor and a stator, and the sets may be disposed by offsetting in the diametrical direction.

Figure 3:
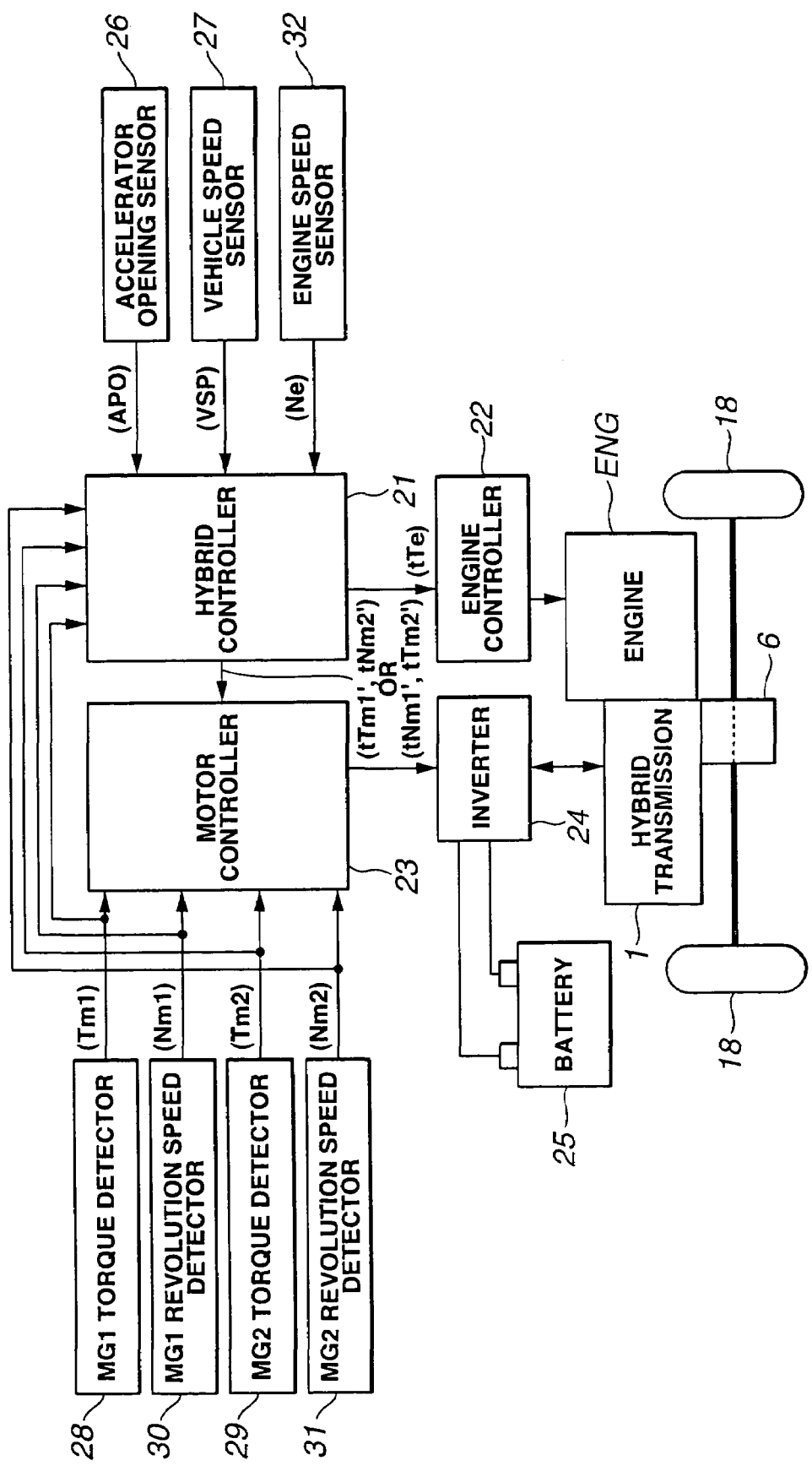
FIG. 3 is a block diagram showing the control system for the hybrid transmission.

As shown in FIG. 3, the shift control system of the hybrid transmission comprises a hybrid controller 21 which supplies a command relating to target engine torque tTe to an engine controller 22. Engine controller 22 controls engine ENG so that the target torque is generated by engine ENG.

Hybrid controller 21 supplies a signal indicative of a combination of a torque command tTm1' of first motor/generator MG1 and a revolution speed command tNm2' of second motor/generator MG2, or a signal indicative of a combination of a revolution speed command tNm1' of first motor/generator MG1 and a torque command tTm1' of second motor/generator MG2, to motor controller 23. Motor controller 23 controls first and second motor/generators MG1 and MG2 through the control of an inverter 24 and a battery 25 according to the received signal so as to achieve the aimed combination of the torque command and the revolution speed command.

Hybrid control 21 receives a signal indicative of outputted an accelerator opening APO detected by an accelerator opening sensor 26 from an depression quantity of an accelerator pedal, a signal indicative of a vehicle speed VSP detected a vehicle speed sensor 27, signals indicative of actual torques Tm1 and Tm2 of first and second motor/generators MG1 and MG2, which are respectively detected by torque detectors 28 and 29, signals indicative of actual revolution speeds Nm1 and Nm2 of first and second motor/generators MG1 and MG2 which are respectively detected by revolution speed detectors 30 and 31, and a signal indicative of engine revolution speed Ne detected by an engine speed sensor 32. These signals outputted from torque detectors 28 and 29 and revolution speed detectors 30 and 31 are also supplied to motor controller 23. Motor controller 23 executes a feedback control according to the signals of detectors 28 through 31 and differences between the actual value and the command value of the torque and the revolution speed so as to bring the actual value closer to the command value.

Hybrid controller 21 executes a control of the hybrid transmission by executing a processing shown by a block diagram in FIG. 4, on the basis of the above-discussed input information. A target driving torque calculating section 41 shown in FIG. 4 calculates a target driving torque tTd demanded by a driver from accelerator opening APO and vehicle speed VSP and by a known map retrieval method. A target engine (prime mover) output calculating section 42 calculates a drive axle revolution speed Nd by multiplying vehicle speed VSP and a constant Kr determined by a wheel radius or the like. That is, a multiplier 42a calculates a target driving force tPv of wheels 18 by multiplying drive axle revolution speed Nd and target driving torque tTd (tPv=Nd×tTd). Further, an adder 42b obtains the sum of target driving force tPv and loss of first and second motor/generators MG1 and MG2. If necessary, a transmission loss of Ravigneaux planetary gearset 2 may be added to target driving force tPv.

An engine (prime mover) operating-point determining section 43 determines an engine operating point (tTe, tNe) as a combination of target engine (prime mover) torque tTe and a target engine (prime mover) revolution speed tNe for generating a terget engine (prime mover) output tPe. The engine operating point is determined by an optimal fuel consumption control wherein the engine operating point (tTe, tNe) is set at a combination of an engine torque Te and an engine revolution speed Ne by which target engine output tPe is achieved while keeping the minimum fuel consumption, on the basis of an engine performance map shown in FIG. 5.

Figure 5:
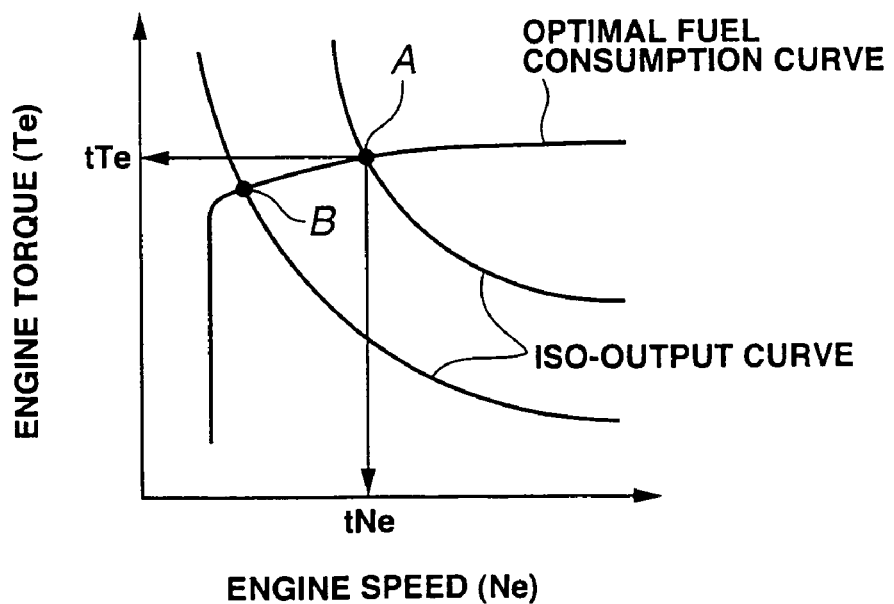
FIG. 5 is a graph showing an optimal fuel consumption curve and iso-output curves of an engine employed together with the control system.

FIG. 5 shows a combination of engine torque Te and engine revolution speed Ne, which correspond to the engine output, in the form of iso-output curves. Each of points A and B of the graph in FIG. 4 shows the combination of engine torque Te and engine revolution speed Ne by which the engine output on each iso-output curve is generated while keeping the minimum fuel consumption. Therefore, a line, which connects the minimum fuel consumption points A and B on the respective iso-output curves, is the optimal fuel consumption curve. When engine operating point (tTe, tNe) is obtained on the basis of the optimal fuel consumption control from FIG. 5, an intersection between the iso-output curve corresponding to target engine output tPe and the optimal fuel consumption curve is determined, for example, at point A. Then, a combination of engine torque Te and engine revolution speed Ne is selected corresponding to point A and is determined as an engine operating point (tTe, tNe).

A first motor/generator (MG1) target torque calculating section 44 calculates a target torque tTm1 of first motor/generator MG1 from target engine torque tTe and a transmission target output torque tTo obtained by dividing target driving torque tTd by final gear ratio Gf, using the following expression (5).

$$tTm1 = -\{\beta \cdot To - (1+\beta)tTe\}/(\alpha+1+\beta) \quad (5)$$

Similarly, a second motor/generator (MG2) target torque calculating section 45 calculates a target torque tTm2 of second motor/generator MG1 from target engine torque tTe and transmission target output torque tTo, using the following expression (6).

$$tTm2 = -\{(1+\alpha)tTo - \alpha \cdot tTe\}/(\alpha+1+\beta) \quad (6)$$

A second motor/generator (MG2) target revolution speed calculating section 46 calculates a target revolution speed tNm2 of second motor/generator MG2 from target engine revolution speed tNe and a transmission output revolution speed No obtained by multiplying driving axle revolution speed Nd and final differential gear ratio Gf, using the following expression (7).

$$tTm2=(1+\beta)No-\beta \cdot tNe \quad (7)$$

Similarly, a first motor/generator (MG1) target revolution speed calculating section 47 calculates a target revolution speed tNm1 of first motor/generator MG1 from target engine revolution speed tNe and transmission output revolution speed No, using the following expression (8).

$$tTm1=(1+\alpha)tNe-\alpha \cdot tNe \quad (8)$$

A motor/generator control command calculating section 48 determines which of first and second motor/generators MG1 and MG2 is controlled in torque and which of first and second motor/generators MG1 and MG2 is controlled in revolution speed, by executing the processing shown in FIG. 6. When motor/generator control command calculating section 48 determines to execute the torque control of first motor/generator MG1 and the revolution speed control of second motor/generator MG2, motor/generator control command calculating section 48 outputs a signal indicative of the combination of a torque command tTm1' of first motor/generator MG1 and a revolution speed command tNm2' of second motor/generator MG2, which will be discussed later, to motor controller 23 shown in FIG. 3. On the other hand, when motor/generator control command calculating section 48 determines to execute the torque control of second motor/generator MG2 and the revolution speed control of first motor/generator MG1, motor/generator control command calculating section 48 outputs a signal indicative of the combination of a torque command tTm2' of second motor/generator MG2 and a revolution speed command tNm1' of first motor/generator MG1, which will be discussed later, to motor controller 23 shown in FIG. 3.

At step S1 in FIG. 6, motor/generator control command calculating section 48 of hybrid controller 21 sets target torque tTm1 of first motor/generator MG1 at torque command tTm1' and target revolution speed tNm2 of second motor/generator MG2 at revolution speed command tNm2' so as to execute the torque control of first motor/generator MG1 and the revolution speed control of second motor/generator MG2. Further, controller 21 outputs the signal indicative of the combination of torque command tTm1' and revolution speed command tNm2' to motor controller 23.

At step S2 hybrid controller 21 determines whether or not an actual torque Tm2 of second motor/generator MG2 under the revolution speed control becomes saturated, that is, whether actual torque Tm2 is in a saturated state out of a range between upper and lower limits. When the determination at step S2 is negative, it is determined that there is not caused an unexpected problem as to shift. Therefore, the program returns to step S1 to continue the control of first and second motor/generators MG1 and MG2 by continuously executing the direct power distribution. When the determination at step S2 is affirmative, controller 21 changes the torque control of first motor/generator MG1 to the revolution speed control and the revolution speed control of second motor/generator MG2 to the torque control by executing steps S3 through S5.

More specifically, in order to change the torque control of first motor/generator MG1 to the revolution speed control, at step S3 hybrid controller 21 starts the revolution speed control of first motor/generator MG1 by setting an initial value of revolution speed command tNm1' at actual revolution speed Nm1 of first motor/generator MG1. At step S4 hybrid controller 21 calculates revolution speed command tNm1' so as to smoothly vary the actual revolution speed from the initial value to target revolution speed tNm1, and outputs the obtained revolution speed command tNm1' to motor controller 23. Simultaneously, in order to change the revolution speed control of second motor/generator MG2 to the torque control, at step S3 hybrid controller 21 starts the torque control of second motor/generator MG2 by setting an initial value of torque command tTm2' at actual torque Tm2 of second motor/generator MG2. At step S4 hybrid controller 21 calculates torque command tTm2' so as to smoothly vary the actual torque from the initial value to target torque tTm2, and outputs the obtained torque command tTm2' to motor controller 23.

After revolution speed command tNm1' of first motor/generator MG1 reaches target revolution speed tNm1 and torque command tTm2' of second motor/generator MG2 reaches torque speed tTm2 as a result of this lump control, at step S6 hybrid controller 21 executes the revolution speed control of first motor/generator MG1 by setting revolution speed command tNm1' at target revolution speed tNm1 and executes the torque control of second motor/generator MG2 by setting torque command tTm2' at target torque tTm2. Then, hybrid controller 21 outputs a signal indicative of the combination of revolution speed command tNm1' of first motor/generator MG1 and torque command tTm2' of second motor/generator MG2 to motor controller 23.

At step S6 subsequent to the execution of step S5, hybrid controller 21 determines whether or not an actual torque Tm1 of first motor/generator MG1 under the revolution speed control becomes saturated, that is, whether actual torque Tm1 is in a saturated state out of a range between upper and lower limits. When the determination at step S6 is negative, it is determined that there is not caused an unexpected problem as to shift. Therefore, the program returns to step S5 to continue the control of first and second motor/generators MG1 and MG2 by continuously executing the direct power distribution. When the determination at step S6 is affirmative, controller 21 changes the revolution speed control of first motor/generator MG1 to the torque control and the torque control of second motor/generator MG2 to the revolution speed control by executing steps S7, S8 and S1.

More specifically, in order to change the revolution speed control of first motor/generator MG1 to the torque control, at step S7 hybrid controller 21 starts the torque control of first motor/generator MG1 by setting an initial value of torque command tTm1' at actual torque Tm1 of first motor/generator MG1. At step S8 hybrid controller 21 calculates torque command tNm1' so as to smoothly vary the actual torque from the initial value to target torque tTm1, and outputs the obtained torque command tNm1' to motor controller 23. Simultaneously, in order to change the torque control of second motor/generator MG2 to the revolution speed control, at step S7 hybrid controller 21 starts the revolution speed control of second motor/generator MG2 by setting an initial value of revolution speed command tNm2' at actual revolution speed Nm2 of second motor/generator MG2. At step S8 hybrid controller 21 calculates revolution speed command tTm2' so as to smoothly vary the actual revolution speed from the initial value to target revolution speed tNm2, and outputs the obtained revolution speed command tNm2' to motor controller 23.

After torque command tTm1' of first motor/generator MG1 reaches target torque tTm1 and revolution speed command tNm2' of s cond motor/generator MG2 reaches target revolution speed tNm2 as a result of this lump control, at step S1 hybrid controller 21 executes the torque control of first motor/generator MG1 by setting torque command tTm1' at target torque tTm1 and executes the revolution speed control of second motor/generator MG2 by setting revolution speed command tNm2' at target revolution speed tNm2. Then, hybrid controller 21 outputs a signal indicative of the combination of torque command tTm1' of first motor/generator MG1 and revolution speed command tNm2' of second motor/generator MG2 to motor controller 23.

As discussed above, when the torque of the motor/generator under the revolution speed control becomes saturated, that is, when the determination at step S2 or SE is affirmative, the revolution speed control of the corresponding motor/generator is changed to the torque control, and simultaneously the torque control of the other motor/generator is changed to the revolution speed control. By these changes between the revolution speed control and the torque control of the respective first and second motor/generators MG1 and MG2, the following advantages are ensured.

Figure 8:
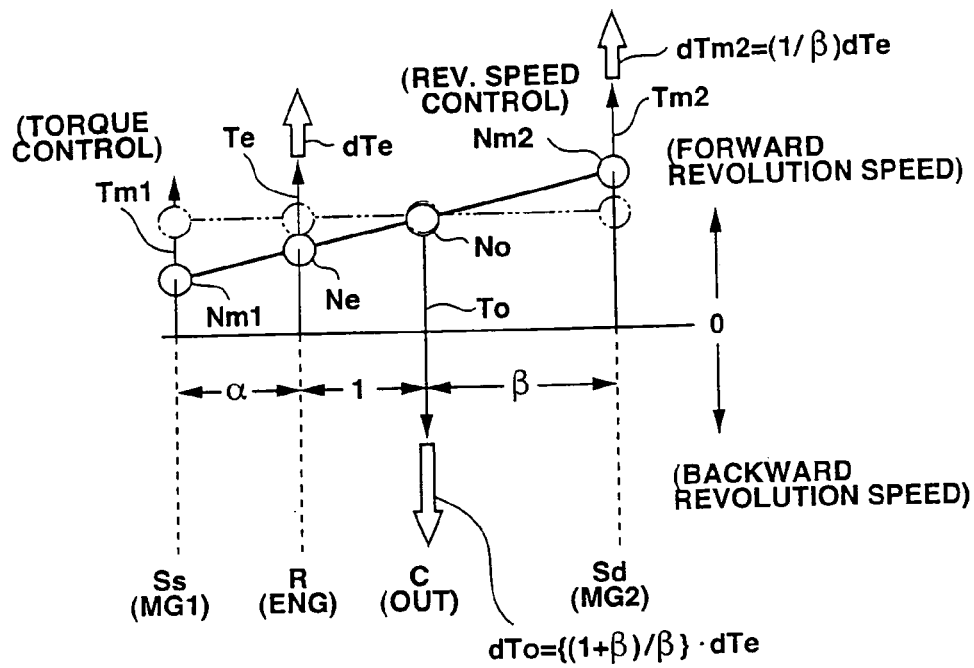
FIG. 8 is a lever diagram showing a condition of generating an unexpected shift of a hybrid transmission due to an unexpected increase of an engine torque.

Subsequently, there will be discussed the advantages ensured by executing the changeover of the control mode of first and second motor/generators MG1 and MG2 when the operation condition of the hybrid transmission is in a situation shown by FIG. 8, with reference to FIG. 9. FIG. 8 shows that actual torque Tm2 of second motor/generator MG2 under the revolution speed control becomes saturated by the increase of torque Tm2 by a quantity dTm2, as a result that an error of the actual torque of engine EGN relative to the torque command is caused by the disturbance or the like during when the torque control of first motor/generator MG1 and the revolution speed control of second motor/generator MG2 are being executed.

If the changeover of the control mode is not executed even when actual torque Tm2 of second motor/generator MG2 becomes saturated, that is, when the torque control of first motor/generator MG1 and the revolution speed control of second motor/generator MG2 are continued, controller 21 executes an unexpected shift for varying the state of the lever from a lever state shown by a continuous line in FIG. 8 to a lever state shown by a two-dot chain line in FIG. 8, and therefore the output torque To is increased by an increase dTo and does not approach the desired value.

Figure 9:
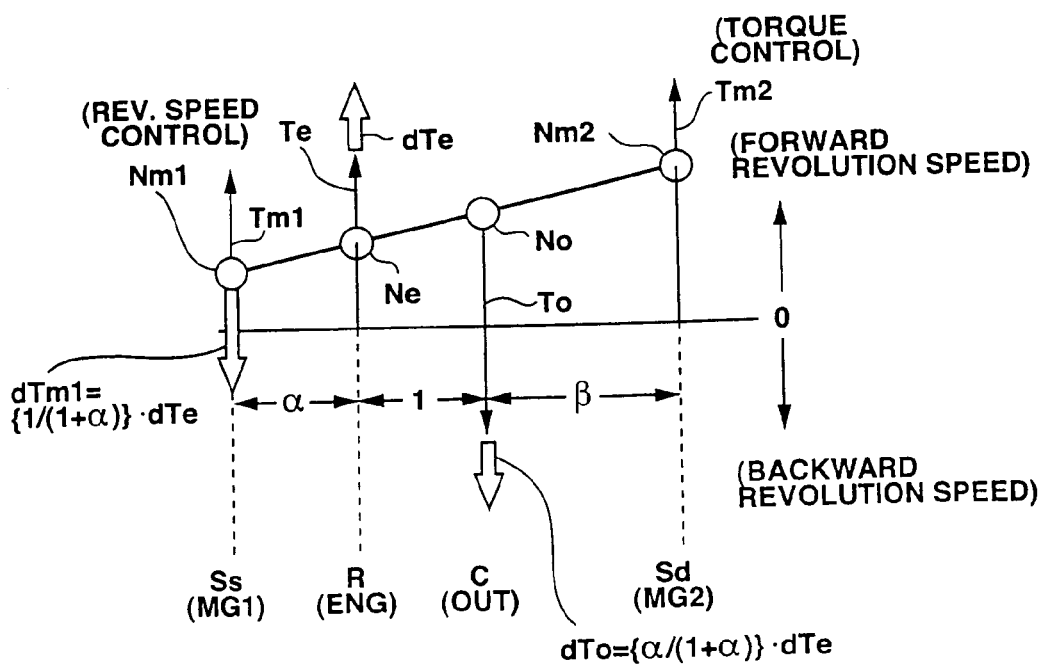
FIG. 9 is a lever diagram employed for explaining a method of preventing the unexpected shift by executing the control program shown in FIG. 6.

In contrast, by executing the control shown by the program in FIG. 6, when torque Tm2 of second motor/generator MG2 under the revolution speed control becomes saturated (the affirmative determination at step S2), the lever balance is changed from a state of FIG. 8 to a state of FIG. 9 by the changeover of the revolution speed control of second motor/generator MG2 to the torque control and the changeover of the torque control of first motor/generator MG1 to the revolution speed control (the execution of steps S3 through S5). More specifically, the unexpected increase dTe due to the disturbance of the engine torque is absorbed by the torque deviation $dTm1 = \{1/(1+\alpha)\}dTe$ of first motor/generator MG1 and the deviation $dTo=\{\alpha/(1+\alpha)\}dTe$ of output torque To. Accordingly, the revolution speed control of first motor/generator MG1 is executed appropriately. The lever state is maintained at a state shown by a continuous line in FIG. 9 which corresponds to the state shown by the continuous line in FIG. 8. Consequently, this control according to the present invention removes an afraid that an unexpected shift is executed by unexpected increase dTe due to the disturbance of the engine torque and that an change of output torque To is caused thereby.

Further, the first embodiment of the shift control system according to the present invention is arranged such that torque command tTm2' (tTm1') of the corresponding motor/generator MG2 (MG1) to be changed from the revolution speed control to the torque control is gradually approached from actual torque Tm2 (Tm1) at a moment just before the changeover to target torque tTm2 (tTm1) by executing steps S3 and S4, or steps S7 and S8, and that revolution speed command tNm1' (tNm2') of the corresponding motor/generator MG1 (MG2) to be changed from the torque control to the revolution speed control is gradually approached from actual revolution speed Nm1 (Nm2) at a moment just before the changeover to target revolution speed tNmt (tNm2) by executing steps S3 and S4 or steps S7 and S8. Accordingly, this arrangement prevents the quick changes of the torque and the revolution speed of first and second motor/generators MG1 and MG2 even when the changeover of the control mode for each of first and second motor/generators MG1 and MG2, and thereby preventing the generation of shocks.

Figure 7:
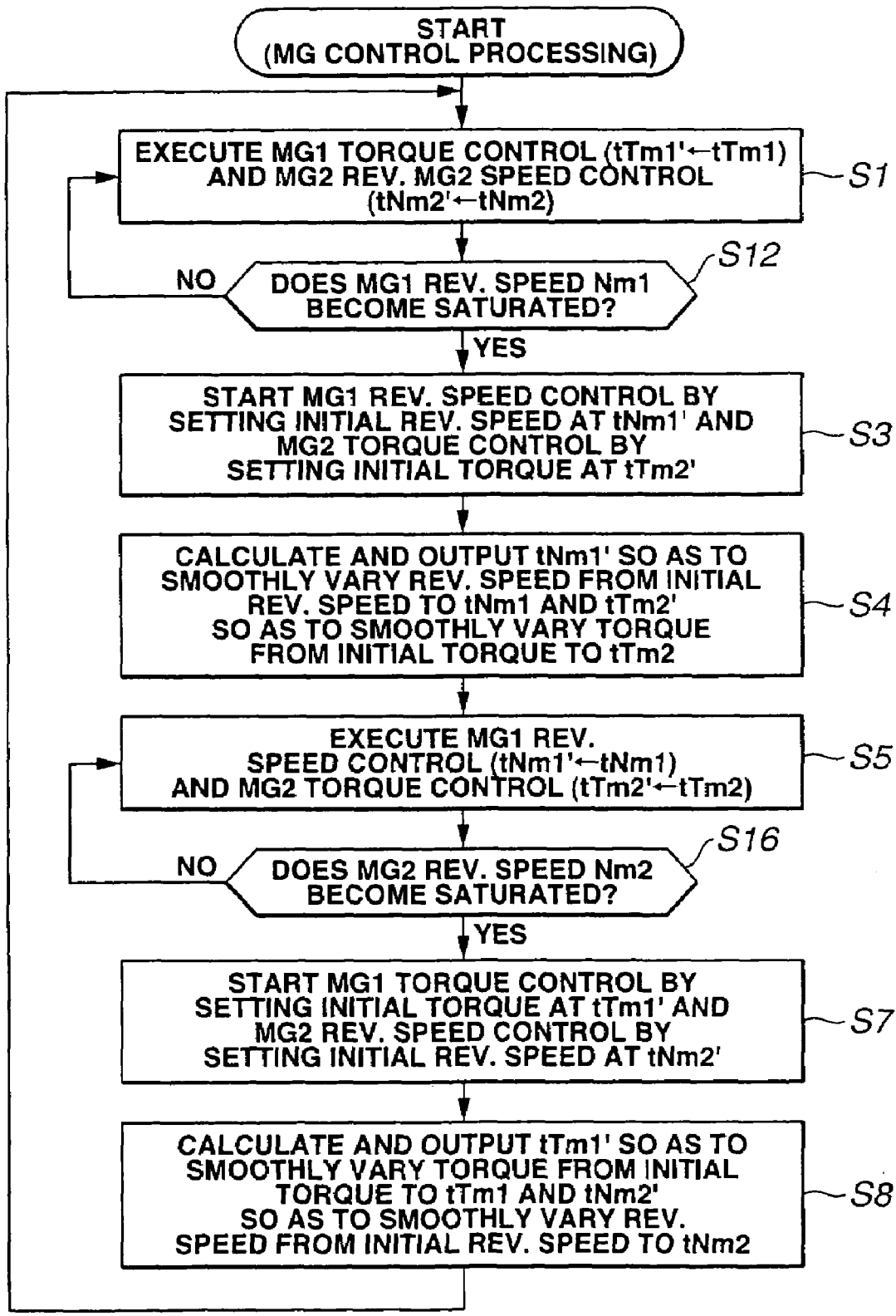
FIG. 7 is a flowchart showing another control program employed in a second embodiment.

Referring to FIG. 7, there is discussed a second embodiment of the shift control system for the hybrid transmission in accordance with the present invention. A flowchart shown in FIG. 7 represents a processing for calculating a motor/generator control command. The control executed in the second embodiment is basically the same as that executed in the first embodiment except that the monitored object as to the saturation is different between the first and second embodiment. More specifically, although the processing shown in FIG. 6 of the first embodiment is arranged such that the revolution speed control of the motor/generator under the revolution speed control is changed to the torque control and simultaneously the torque control of the other motor/generator is changed to the revolution speed control when the torque of the corresponding motor/generator under the revolution speed control becomes saturated, the processing shown in FIG. 7 of the second embodiment is arranged such that the torque control of the motor/generator under the torque control is changed to the revolution speed control and simultaneously the revolution speed control of the other motor/generator is changed to the torque control when the revolution speed of the motor/generator under the torque control becomes saturated.

Accordingly, in the flowchart of FIG. 7, step S2 in FIG. 6 is replaced with step S12, and step S6 is replaced with step S16. The other steps in FIG. 7 respectively execute operations as the same as those of the steps in FIG. 6. Therefore, the corresponding steps are denoted by the same step reference numerals as the steps in FIG. 6, and only steps S12 and S16 are explained herein.

At step S12 hybrid controller 21 determines whether or not revolution speed Nm2 of second motor/generator MG2 under the torque control becomes saturated. When the determination at step S12 is negative, the program returns to step S1 to continue the torque control of first motor/generator MG1 and the revolution speed control of second motor/generator MG2. When the determination at step S12 is affirmative, the program proceeds to step S3 to execute the changeover from the torque control of first motor/generator MG1 to the revolution speed control and the changeover from the revolution speed control of second motor/generator MG2 to the torque control by executing the steps S3 through S5.

At step S16 hybrid controller 21 determines whether or not revolution speed Nm2 of second motor/generator MG2 under the torque control becomes saturated. When the determination at step S16 is negative, the program returns to step 55 to continue the revolution speed control of first motor/generator MG1 and the torque control of second motor/generator MG2. When the determination at step S16 is affirmative, the program proceeds to step S7 to execute the changeover from the revolution speed control of first motor/generator MG1 to the torque control and the changeover from the torque control of second motor/generator MG2 to the revolution speed control by executing the steps S6, S7 and S1.

With the thus arranged second embodiment according to the present invention, the shift control is continued by changing the torque control of the motor/generator under the torque control to the revolution speed control when the revolution speed of the motor generator under toe torque control becomes saturated. Therefore the saturation of the revolution speed is solved. Simultaneously, the revolution speed control of the other motor/generator under the revolution speed control is changed to the torque control so that the other motor/generator continues the output power control. Since the other motor/generator has a margin of the revolution speed relative to the saturation of the revolution speed, there is caused no saturation in the revolution speed of the other motor/generator. Therefore, both motor/generators do not cause the saturation of the revolution speed. Consequently, the shift control system of the second embodiment according to the present invention also solves the above-discussed problem that an unexpected shifting is executed due to the saturation of the revolution speed as same as the saturation of the torque.

This application is based on Japanese Patent Application No. 2002-342572 filed on Nov. 26, 2002 in Japan. The entire contents of this Japanese Patent Application are incorporated herein by reference.

Although the invention has been described above by reference to certain embodiments of the invention, the invention is not limited to the embodiments described above. Modifications and variations of the embodiments described above will occur to those skilled in the art, In light of the above teaching. The scope of the invention is defined with reference to the following claims.

What is claimed is:

1. A transmission control system for a hybrid vehicle, comprising:
   a hybrid transmission comprising a differential mechanism which includes at least four rotating members, rotating conditions of all of the rotating members being determined when rotating conditions of two of the rotating members are determined, four of the rotating members being connected to one of two motor/generators, an input connected to a prime mover, an output connected to a driveline, and the other of the motor/generators, the one of the motor/generators being controlled by means of a revolution speed control to execute a transmission ratio control, the other of the motor/generators being controlled by means of a torque control to execute an output control; and
   a controller connected to the hybrid transmission including the motor/generators, the controller being arranged to change the torque control of the motor/generator under the torque control to the revolution speed control and to change the revolution speed control of the other motor/generator under the revolution speed control to the torque control, when one of the torque of the motor/generator under the revolution speed control and the revolution speed of the other motor/generator under the torque control becomes saturated,
   wherein the controller determines that the torque of the motor/generator under the revolution speed control becomes saturated when the torque detected by a torque detector becomes out of a range between upper and lower torque limits of the motor/generator under the revolution speed control, and
   wherein the controller determines that the revolution speed of the motor/generator under the torque control becomes saturated when the revolution speed detected by a revolution speed detector becomes out of a range between upper and lower revolution speed limits of the motor/generator under the torque control.

2. The transmission control system as claimed in claim 1, wherein the controller is further arranged to change the revolution speed control of the motor/generator under the revolution speed control to the torque control and to change the torque control of the other motor/generator under the torque control to the revolution speed control, only when the torque of the motor/generator under the revolution speed control becomes saturated.

3. The transmission control system as claimed in claim 2, wherein the controller sets a torque command of the motor/generator to be changed from the revolution speed control to the torque control so that an actual torque of the motor/generator to be changed from the revolution speed control to the torque control is smoothly varied from an actual torque at a moment just before a changeover from the revolution speed control to the torque control to a target torque, and sets a revolution speed command of the motor/generator to be changed from the torque control to the revolution speed control so that an actual revolution speed of the motor/generator to be changed from the torque control to the revolution speed control is smoothly varied from an actual revolution speed at a moment just before a changeover from the torque control to the revolution speed control to a target revolution speed.

4. The transmission control system as claimed in claim 1, wherein the controller is further arranged to change the torque control of the motor/generator under the torque control to the revolution speed control and to change the revolution speed control of the other motor/generator under the revolution speed control to the torque control, only when the revolution speed of the motor/generator under the torque control becomes saturated.

5. The transmission control system as claimed in claim 4, wherein the controller sets a revolution speed command of the motor/generator to be changed from the torque control to the revolution speed control so that an actual revolution speed of the motor/generator to be changed from the torque control to the revolution speed control is smoothly varied from an actual revolution speed at a moment just before a changeover from the torque control to the revolution speed control to a target revolution speed, and sets a torque command of the motor/generator to be changed from the revolution speed control to the torque control so that an actual torque of the motor/generator to be changed from the revolution speed control to the torque control is smoothly varied from an actual torque at a moment just before a changeover from the revolution speed control to the torque control to a target torque.

6. The transmission control system as claimed in claim 1, wherein the controller is further arranged to determine whether the torque of the motor/generator under the revolution speed control becomes saturated.

7. The transmission control system as claimed in claim 1, wherein the controller is further arranged to determine whether the revolution speed of the motor/generator under the torque control becomes saturated.

8. The transmission control system as claimed in claim 1, further comprising revolution speed detectors for detecting the revolution speeds of the motor/generators and torque detectors for detecting the torques of the motor/generators.

9. The transmission control system as claimed in claim 1, wherein the controller is further arranged to determine a prime mover operating point indicative of a combination of a revolution speed and a torque of the prime mover according to a driver's demand so as to maintain an optimal fuel consumption of the hybrid vehicle.

10. A method of controlling a hybrid transmission which is for a hybrid vehicle and comprises a differential mechanism including at least four rotating members, rotating conditions of all of the rotating members being determined when rotating conditions of two of the rotating members are determined, four of the rotating members being connected to one of two motor/generators, an input connected to a prime mover, an output connected to a driveline, and the other of the motor/generators, the one of the motor/generators being controlled by means of a revolution speed control to execute a continuous variable transmission ratio control, the other of the motor/generators being controlled by means of a torque control to execute an output control, the method comprising:

changing the torque control of the motor/generator under the torque control to the revolution speed control and changing the revolution speed control of the other motor/generator under the revolution speed control to the torque control, when one of the torque of the motor/generator under the revolution speed control and the revolution speed of the motor/generator under the torque control becomes saturated, wherein the torque becomes saturated when the torque becomes out of a torque range between upper and lower torque limits of the motor/generator under the revolution speed control or the revolution speed becomes saturated when the revolution speed becomes out of a revolution speed range between upper and lower revolution speed limits of the motor/generator under the torque control.

11. A control system for controlling a hybrid transmission applied to a hybrid vehicle, the hybrid transmission comprising a differential mechanism which includes at least four rotating members, rotating conditions of all of the rotating members being determined when rotating conditions of two of the rotating members are determined, four of the rotating members being connected to one of two motor/generators, an input connected to a prime mover, an output connected to a driveline, and the other of the motor/generators, the one of the motor/generators being controlled by means of a revolution speed control to execute a transmission ratio control, the other of the motor/generators being controlled by means of a torque control to execute an output control, the control system comprising:

means for changing the torque control of the motor/generator under the torque control to the revolution speed control and the revolution speed control of the other motor/generator under the revolution speed control to the torque control, when one of the torque of the motor/generator under the revolution speed control and the revolution speed of the other motor/generator under the torque control becomes saturated, wherein the torque becomes saturated when the torque becomes out of a torque range between upper and lower torque limits of the motor/generator under the revolution speed control or the revolution speed becomes saturated when the revolution speed becomes out of a revolution speed range between upper and lower revolution speed limits of the motor/generator under torque control.

* * * * *